United States Patent [19]

Towner et al.

[11] Patent Number: 4,694,910
[45] Date of Patent: Sep. 22, 1987

[54] PACKING TUBE ASSEMBLY FOR PUMPING WELLS

[75] Inventors: Geoffrey F. Towner; Charles A. Carter, both of Dallas, Tex.

[73] Assignee: Texaust Australia Limited, Canberra, Australia

[21] Appl. No.: 874,657

[22] Filed: Jun. 16, 1986

[51] Int. Cl.⁴ .................. E21B 33/03; E21B 19/16
[52] U.S. Cl. ................................. 166/379; 166/76; 166/84; 166/387; 277/205
[58] Field of Search .............. 166/68, 106, 84, 82, 166/88, 70, 67, 378, 380, 76, 379, 387; 277/30, 31, 152, 153, 205

[56] References Cited

U.S. PATENT DOCUMENTS

| | | | |
|---|---|---|---|
| 1,060,961 | 5/1913 | Waitz | 166/84 |
| 1,071,300 | 8/1913 | Shiery | 166/84 |
| 1,906,933 | 5/1933 | Standlee | 166/106 |
| 2,286,300 | 6/1942 | Outcalt | 166/84 |
| 2,841,007 | 7/1958 | Loomis | 277/205 X |
| 2,966,121 | 12/1960 | Crowl | 166/170 X |
| 3,163,430 | 12/1964 | Normand | 166/84 X |
| 3,187,238 | 6/1965 | Wilson et al. | 166/75.1 X |

FOREIGN PATENT DOCUMENTS 597163  5/1960  Canada .................. 166/106

Primary Examiner—Stephen J. Novosad
Assistant Examiner—David J. Bagnell

[57] ABSTRACT

A packing tube assembly which can easily be substituted for the conventional stuffing box on typical pumping wells to substantially increase the operational life of the packing involved. The assembly includes a mounting bushing for the packing tube having a tapered bore therein by which the rod on which the packing is mounted can be removed and reinserted from the top of the well without removing the packing tube.

6 Claims, 4 Drawing Figures

PACKING TUBE ASSEMBLY FOR PUMPING WELLS

DESCRIPTION

1. Technical Field

The present invention relates to a packing tube for a pumping well and more particular relates to a packing tube which replaces a conventional "stuffing box" on a pumping well and a method of servicing same.

2. Background Art

One of the most common apparatus for lifting oil to the surface in an oil well is the rod-operated, plunger displacement pump. Typically, this type of pump is positioned downhole adjacent the producing formation and is operated by a reciprocating string of sucker rod that extends from the surface downward through the production tubing in the well. To effect a seal at the wellhead, the "polished rod" (i.e. upper end of the sucker rod string) passes through a "stuffing box" which, in turn, is normally threaded onto the pumping tee which serves as the outlet for the produced products.

The stuffing box contains stationary packing which contacts the polished rod as it is reciprocated up and down to wipe the rod and to prevent leakage of products through the stuffing box. Unfortunately, however, the reciprocating movement of the rod through the packing and the sand, grit, etc. that accumulates on the polished rod when it is exposed above the stuffing box causes rapid wearing of the packing and frequent replacement thereof is routinely required. Where pumping is fairly continuous, this packing may have to be replaced as often as every fourteen days, or in more extreme cases as often as once a week. This continuous maintenance is obviously a problem in both expense and in downtime. Further, with the rapid wearing of the packing, the well has to be monitored on a frequent basis to prevent leakage through the stuffing box.

The basic construction and operation of the "stuffing box" as used on pumping wells has changed very little since its inception. Even with improvement in the packing materials, the life of the packing remains short. Therefore, to substantially increase the life of the seal at the well head of a pumping well it appears that an alternate to the conventional stuffing box must be developed.

In U.S. Pat. No. 1,906,933 to Standlee, an uphole booster assembly for a downhole pump is disclosed which inherently replaces the conventional stuffing box at the well head. This booster is comprised of a barrel mounted with a special string of tubing which requires a large diameter portion at the upper end thereof. A plurality of flexible cups are mounted on the upper portion of the sucker rod and are positioned within the barrel to act as a secondary pump to supplement the downhole pump. Soft packing rings are also provided on the sucker rod above the cups to prevent leakage.

While the booster of Standlee performs the same function as a conventional stuffing box and has been known for over fifty years, it apparently has never found acceptance by the industry for this purpose. The reasons for this apparent non-acceptance are believed to be the following.

First, as disclosed, the booster of Standlee has to be positioned within a section of production tubing which has a diameter larger than standard production tubing. This would require an operator wishing to replace a conventional stuffing box with the booster assembly of Standlee to pull the original production tubing and replace it with the required special tubing string of Standlee. The costs involved would not likely to justify the conversion efforts.

Second, and possibly more importantly, the costs of servicing the booster assembly would likely exceed any advantages gained by the conversion. That is, when it becomes necessary to replace worn cups on the sucker rod, the entire assembly, including the barrel, has to pulled from the well head since the rod with the downwardly facing cups thereon can only be pulled into the barrel through the bottom thereof without catching and damaging the cups. This requirement significantly adds to the expense of "repacking" and again would appear to outweigh any advantages gained over a conventional stuffing box.

Accordingly, a need exists for an alternative to a conventional stuffing box wherein the life of the packing therein is substantially increased but one which can be serviced and the packing replaced without a substantial increase in cost and/or downtime.

DISCLOSURE OF THE INVENTION

The present invention provides a packing tube assembly which can easily be physically substituted for a conventional stuffing box on most pumping wells. The packing tube assembly substantially extends the operational life of the packing therein over that expected in conventional stuffing box (e.g. 145-160 days as compared to as little as 14 days) and allows servicing of the packing tube to replace the packing in approximate the same time as that required for a conventional stuffing box.

More specifically, the packing tube assembly is comprised of a tube having a mounting bushing at its upper end which can be threaded into the same pumping tee as that used by a conventional stuffing box. The tube is suspended from the bushing in the pumping tee and extends a short distance downward in the conventional string of production tubing which needs no modification. A rod adaptor is connected between the polished rod and the sucker rod string of the well. The rod adaptor has a plurality of cups mounted thereon which make sealing contact with the tube upon downward movement of the rod adaptor within the tube. One or more guide surfaces, e.g. plastic sleeves, are provided on the rod adaptor above the cups to stabilize the rod adaptor within the tube.

The bore of the mounting bushing and the aligned upper entry into the packing tube are tapered inwardly and downwardly to present a smooth entryway into the tube so that the rod with cups in place can be inserted into the tube from the upper end thereof. This allows the tube to be left in place within the well while the rod adaptor is raised therefrom when the cups thereon need to be replaced. Once the cups have been replaced, the rod adapter can then be lowered and re-inserted into the tube and operation can be quickly resumed.

By not having to remove the entire packing tube assembly as is required with previous assemblies of this type, the time and expense of servicing the packing tube assembly is significantly reduced which allows the present packing tube assembly to be competitive with conventional stuffing boxes.

BRIEF DESCRIPTION OF THE DRAWINGS

The actual contruction, operation, and apparent advantages of the present invention will be better understood by referring to the drawings in which like numerals identify like parts and in which.

BEST MODE FOR CARRYING OUT THE INVENTION

Figures 1, 4:
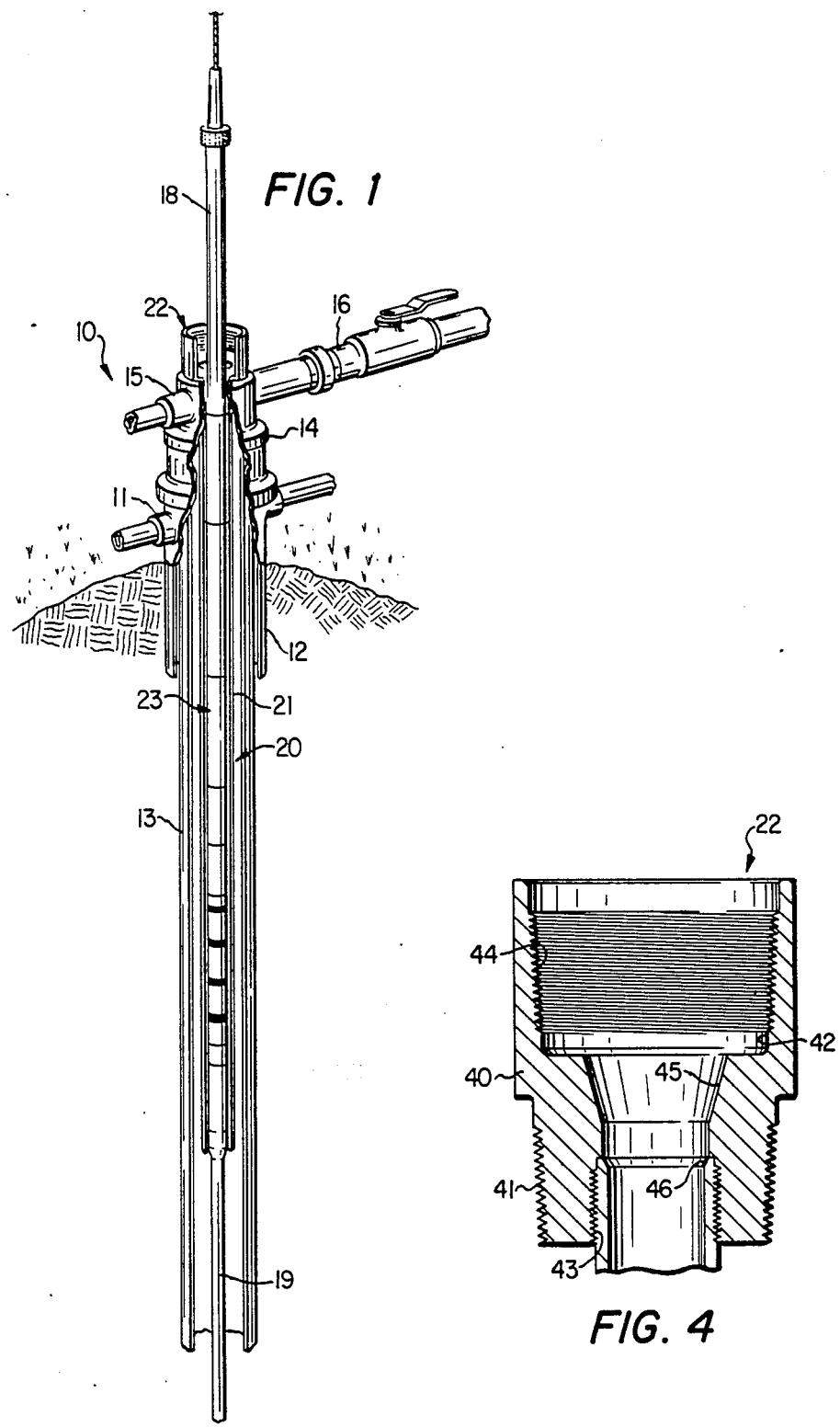
FIG. 1 is a perspective view, partly in section, of a typical well head of a pumping well having the packing tube assembly of the present invention installed therein.
FIG. 4 is an enlarged, sectional view of the mounting bushing of the packing tube of FIG. 2.

Referring more particularly to the drawings, FIG. 1 discloses a typical wellhead 10 of a pumping well which has been completed in accordance with standard techniques and which is representative of most pumping wells now in operation. Wellhead 10, as shown, is comprised of a casing head 11 which is mounted on the upper end of well casing 12 which, in turn, is cemented throughout the wellbore, as will be understood in the art.

A string of standard production tubing 13 is suspended within casing head 11 by tubing hanger 14 and extends downward through casing 12 to a rod-operated, plunger displacement pump (not shown) which, in turn, is positioned adjacent the production interval of the well. A pumping tee 15 is connected to the top of tubing 14 and has an outlet line 16 leading therefrom from which produced products exit the well.

The structure as described to this point is that of a typical pumping well presently in widespread commercial use. In such wells, a conventional "stuffing box" (not shown) would be threaded into the top of pumping tee 15 and the polished rod 18 would pass through a packing which is mounted in the stuffing box. The polished rod 18 is normally coupled at its lower end to a string of sucker rods 19 which extend downward to the plunger of the pump to operate same. The upper end of polished rod 18 is connected to a walking beam (not shown) or the like of a pumping unit which reciprocates the polished rod 18 and sucker rod string 19 up and down to operate the downhole pump. The stationary packing in the conventional stuffing box contacts the polished rod to wipe same and prevent leakage of the produced products through the stuffing box.

Figure 2:
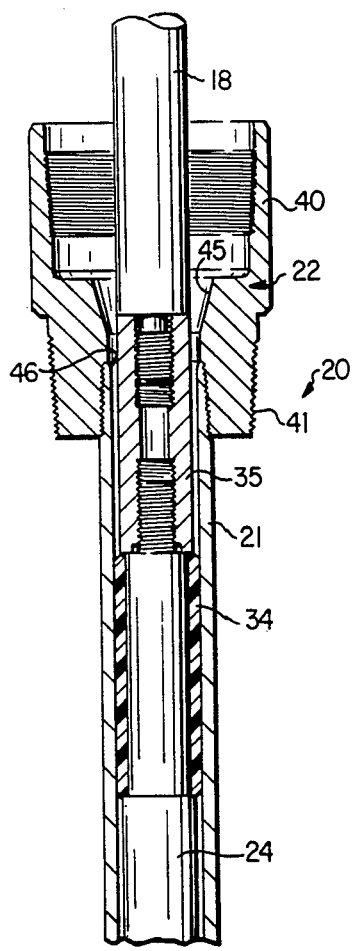
FIG. 2 is a sectional view of the upper portion of the packing tube assembly of the present invention.
Figure 2:
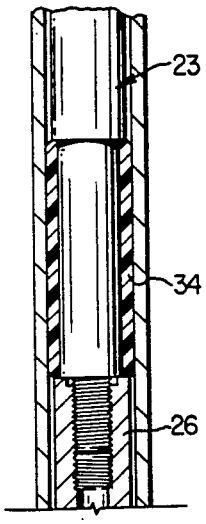
Figure 3:
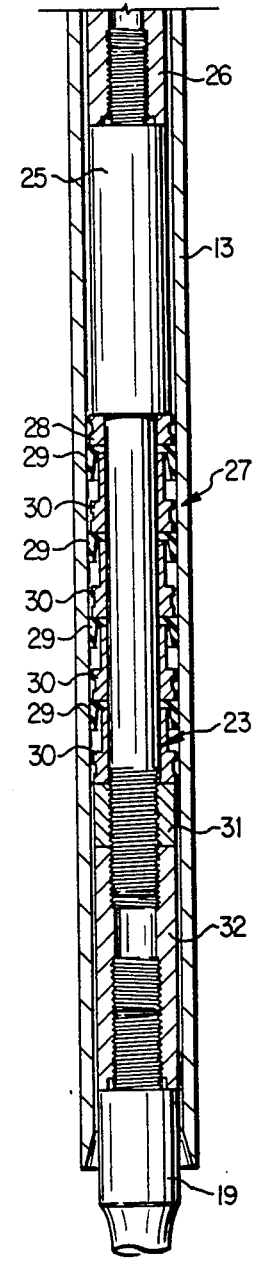
FIG. 3 is a sectional view of the lower portion of the packing tube assembly of FIG. 2.

In accordance with the present invention the conventional stuffing box of a typical pumping well is replaced with packing tube assembly 20. Referring now to FIGS. 1, 2, and 3, packing tube 20 is comprised of packing tube 21 which is threaded at its upper end into mounting bushing 22 which, in turn, is threaded directly into pumping tee 15 where the conventional stuffing box would otherwise be threaded. Packing tube 21 is typically a length of pipe 10-20 feet long and having a inside diameter of 1 to 3 inches for wells having standard production tubing 13 with an inside diameter of 1.9 to 3 inches.

Also, forming a part of packing tube assembly 20 is rod adaptor 23 which, as shown, is comprised of stabilizer rod 24 and packing rod 25 which are coupled together by rod coupling 26. Typically, both the stabilizer and packing rods are formed of steel rod having a typical outside diameter of 1.25 inches with stabilizer rod 24 being approximately 18 inches long and packing rod 25 being approximately 14 inches long for most wells.

Packing rod 25 has a reduced diameter at its lower end on which packing element 27 is mounted. Packing rod 27 is comprised of back spacer 28, resilient, downward-facing cup-shaped washers 29, or packing elements and intermediate spacers 30 which are positioned to separate adjacent cups 29. The cups 29 and spacers 30, when assmbled, are held in place by lock nut 31 which is threaded onto packing rod 25. The cups 29 can be made of any suitable, resilient material, e.g. synthetic rubber. The lower end of packing rod 25 is coupled to sucker rod string 19 by coupling 32.

Stabilizer rod 24 has a plurality (two shown) of stabilizer wear sleeves 34 comprised of a friction-resistance material, e.g. hardened plastic, mounted thereon which have a outer diameter sized to engage the inner wall of packing tube 13 to stabilize rod adapter 23 as it is reciprocated within tube 13. The upper end of stabilizer rod 24 is coupled to polished rod 18 by coupling 35.

Mounting bushing 22 (FIGS. 2 and 4) is comprised of housing 40 having external threads 41 which are adapted to mate with threads in pumping tee 15 (FIG. 1). Housing 40 has a bore 42 thereto with the lower portion thereof being internally threaded 43 to receive packing tube 21. Bore 42 has an upper, large diameter portion 44 which can be internally threaded to receive a blow-out preventer or like safety device, if required, to insure that the well can be closed-in in the event an emergency situation should arise.

The bore 42 extends from the enlarged upper portion 44 through a tapered interval 45 to lower portion 43 thereof. The diameter of upper opening of the tapered interval 45 is greater than the maximum expanded diameter of the cup washers 29 on packer rod 25 for a purpose described below. The upper opening into packing tube 21 is also tapered at 46 so that there are no sharp shoulders between tapered interval 45 and the entry into packing tube 21.

To convert a conventional stuffing box-equipped well to a packing tube-equipped well in accordance with the present invention, the convention stuffing box (not shown) is unthreaded from pumping tee 15 and polished rod 18 is raised until the first joint of sucker rod 19 is adjacent pumping tee 15. Slips (not shown) are inserted into pumping tee 15 to suspend sucker rod string 19 in tubing string 13. The polished rod is disconnected from the sucker rod string and the stuffing box is removed. The polished rod is then connected to rod adaptor 23 which is then inserted into packing tube 21 while it is lying on the ground so that the lower end of the adaptor 23 is exposed from the lower end of packing tube 21. The packing tube assembly is then lifted as a unit and the lower end of rod adaptor 23 is aligned and coupled to the upper end of sucker rod string 19. The slips are removed and the entire unit is lowered into the well until bushing 22 reaches pumping tee 15 where it is threaded therein. The polished rod is then connected to the walking beam and the well is ready for operation.

The packing elements (i.e. cups 29) in the present invention contact the inside of tube 21 as rod adaptor 23 is reciprocated therein and provides an effective traveling seal therebetween. This traveling seal experiences a significantly longer operational life when compared to the stationary packing in a conventional stuffing box, e.g. 145–160 days life for the cups 29 compared to as little as 14 days for the conventional packing.

However, even though the present packing tube assembly substantially increases the time intervals between required servicing operations, there comes a time when the cups 29 must be replaced in the packing tube assembly. With the present assembly, this can be accomplished in a quick and efficient manner. The walking beam of the pumping unit lifts the polished rod-sucker rod string to the top of the stroke and slips are set at bushing 22 to hold the pump string in that position. The polished rod clamp is loosened and moved down on the pump string to a position near bushing 22 as walking beam is lowered. The clamp is then retightened and the walking beam is again raised to lift rod adaptor 23 out of the top of tube 21. Cups 29 are then replaced on packing rod 25 and the above procedure is reversed to thereby lowered the rod adaptor back into tube 21 through the upper end thereof.

Even though the normal uncompressed diameter of cups 29 is larger than the inside diameter of tube 21, each cup will contact tapered interval 45 of bushing 22 as it is lowered into tube 21 thereby compressing each cup as it moves therethrough to provide a smooth entry for the packing elements into tube 21. This ability to pull and replace rod adaptor from the top of tube 21 while leaving tube 21 in place substantially reduces the required service time and expense thereby allowing the present invention to be competitive with the conventional stuffing box it is designed to replace.

What is claimed is:

1. In a pumping well having a conventional production tubing string, a downhole pump, a sucker rod string for operating said downhole pump, a polished rod forming the upper end of said sucker rod string, and a pumping tee forming part of a wellhead; a packing tube assembly for replacing a conventional stuffing box, said packing tube assembly comprising:
   a packing tube;
   a rod adaptor adapted to be coupled between said polished rod and said sucker rod string and adapted to extend throughout said packing tube when positioned therein;
   compressible packing means on said rod adaptor adapted to provide a seal between said rod adaptor and said packing tube when said rod adaptor is in position within said packing tube;
   stabilizing means on said rod adaptor adapted to engage said packing tube to stabilize said rod adaptor within said packing tube during operation; and
   a mounting bushing connected to the top of said packing tube and adapted to be threaded into said pumping tee to secure said packing tube position within said production tubing string; said bushing having a bore therethrough, said bore having a smoothly tapered interval therein which tapers downwardly and inwardly from a diameter which is greater than the diameter of the packing means in its uncompressed state to a diameter of the packing means in its compressed state which is equal to the inside diameter of said packing tube whereby said rod adaptor with said packing means thereon can be inserted into said packing tube through the upper and thereof without damaging said packing means.

2. The packing tube assembly of claim 1 wherein said rod adaptor comprises:
   a stabilizer rod on which said stabilizing means is mounted;
   a packing rod on which said packing means is mounted; and
   means for connecting said stabilizer rod and said packing rod together.

3. The packing tube assembly of claim 1 wherein said packing means comprises:
   a plurality of downwardly-facing, cup-shaped packing elements mounted on said packing rod;
   a plurality of spacers positioned between said cup-shaped packing elements to separate same; and
   means to secure said packing elements and said spacers on said packing rod.

4. The packing tube of claim 3 wherein said stabilizer rod comprises:
   a length of rod; and wherein said stablizing means comprises:
   a plurality of spaced stabilizer wear sleeves mounted on said rod and having an outer diameter sized to slidably engage the inner wall of said packing tube when said rod adaptor is in an operable position within said packing tube.

5. A method of converting a conventional stuffing box-equipped pumping well to a packing tube-equipped well comprising:
   disconnecting the polished rod of the pumping well from the sucker rod string while suspending said sucker rod string within the well by the use of slips;
   unthreading the conventional stuffing box from the pumping tee of the well and removing the stuffing box;
   attaching the polished rod to the upper end of a rod adaptor of a packing tube assembly, said rod adaptor having packing elements thereon;
   inserting said rod adaptor with said polished rod attached into the packing tube of said packing tube assembly;
   aligning said packing tube assembly with said sucker rod string;
   connecting the lower end of said rod adaptor to said sucker rod string;
   removing said slips and lowering said packer tube assembly through said pumping tee; and
   connecting the upper end of said packing tube to said pumping tee.

6. In a pumping well having a packing tube assembly in lieu of a conventional stuffing box, said packing tube assembly having a packing tube connected to the pumping tee of the well and a rod adaptor connected into the pump string and slidability positioned in said packing tube, said adaptor having packing elements thereon which seal with said tube during pumping operations, a method of servicing said packing tube assembly comprising: raising the pump string through said packing tube until said packing elements on said rod adaptor are positioned out of and above said packing tube while said packing tube remains in place within the well;
   replacing said packing elements on said rod adaptor; and
   lowering said pump string until said rod adaptor has reentered said packing tube from the upper end thereof.

* * * * *